(12) United States Patent
Yoshiya et al.

(10) Patent No.: US 8,275,196 B2
(45) Date of Patent: Sep. 25, 2012

(54) IMAGE PROCESSING DEVICE AND IMAGE PROCESSING METHOD

(75) Inventors: Fumio Yoshiya, Tokyo (JP); Akihiro Oue, Tokyo (JP); Masahiro Yamada, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/196,463

(22) Filed: Aug. 2, 2011

(65) Prior Publication Data

US 2012/0155742 A1    Jun. 21, 2012

(30) Foreign Application Priority Data

Dec. 21, 2010    (JP) ................................. 2010-284680

(51) Int. Cl.
  *G06K 9/00*        (2006.01)
(52) U.S. Cl. .......................................... 382/154; 348/51
(58) Field of Classification Search .................. 382/154; 345/419, 427; 348/51, 52, 54; 356/12
  See application file for complete search history.

(56) References Cited

U.S. PATENT DOCUMENTS

| 5,696,596 | A | * | 12/1997 | Taniguchi | 358/300 |
| 5,880,883 | A | * | 3/1999 | Sudo | 359/462 |
| 7,787,008 | B2 | * | 8/2010 | Fukushima et al. | 348/51 |
| 2004/0179263 | A1 | * | 9/2004 | Yoshikawa et al. | 359/462 |

FOREIGN PATENT DOCUMENTS

| JP | 09-191393 | 7/1997 |
| JP | 2002-73003 | 3/2002 |
| JP | 2006-140553 A1 | 1/2006 |
| JP | 2008-167310 | 7/2008 |
| JP | 2011-117787 | * 6/2011 |

OTHER PUBLICATIONS

Notification of Reasons for Rejection mailed by Japan Patent Office on Nov. 4, 2011 in Japanese patent application No. 2010-284680.

* cited by examiner

*Primary Examiner* — Samir Ahmed
(74) *Attorney, Agent, or Firm* — Knobbe, Martens, Olson & Bear, LLP

(57) ABSTRACT

According to one embodiment, an image processing device includes a plurality of parallax image generators. Each of the parallax image generators is configured to generate a first image and a second image based on an input image and a parameter for setting a distance between viewpoints. There is a first parallax between the first image and the second image. The first parallax depends on the parameter for setting the distance between viewpoints. The input image is inputted to the parallax image generators in common. A plurality of parameters for setting the distance between viewpoints different from each other are inputted to the parallax image generators, respectively.

14 Claims, 5 Drawing Sheets

PARALLAX IMAGE
FOR LEFT EYE

PARALLAX IMAGE
FOR RIGHT EYE

IMAGE PROCESSING DEVICE AND IMAGE PROCESSING METHOD

CROSS REFERENCE TO RELATED APPLICATIONS

This application is based upon and claims the benefit of priority from the prior Japanese Patent Application No. 2010-284680, filed on Dec. 21, 2010, the entire contents of which are incorporated herein by reference.

FIELD

Embodiments described herein relate generally to an image processing device and an image processing method.

BACKGROUND

Recently, a stereoscopic image display apparatus has been widely used. A plurality of parallax images seen from different viewpoints are displayed on the stereoscopic image display apparatus. An image signal is seen as a stereoscopic image by seeing one image from the left eye and seeing another image from the right eye.

In an autostereoscopic display, it is possible to display more natural stereoscopic image by displaying, for example, nine parallax images, which is more than two parallax images. However, it is necessary to newly develop a complicated circuit for generating a lot of parallax images.

DETAILED DESCRIPTION

In general, according to one embodiment, an image processing device includes a plurality of parallax image generators. Each of the parallax image generators is configured to generate a first image and a second image based on an input image and a parameter for setting a distance between viewpoints. There is a first parallax between the first image and the second image. The first parallax depends on the parameter for setting the distance between viewpoints. The input image is inputted to the parallax image generators in common. A plurality of parameters for setting the distance between viewpoints different from each other are inputted to the parallax image generators, respectively.

Embodiments will now be explained with reference to the accompanying drawings.

First Embodiment

Figure 1:
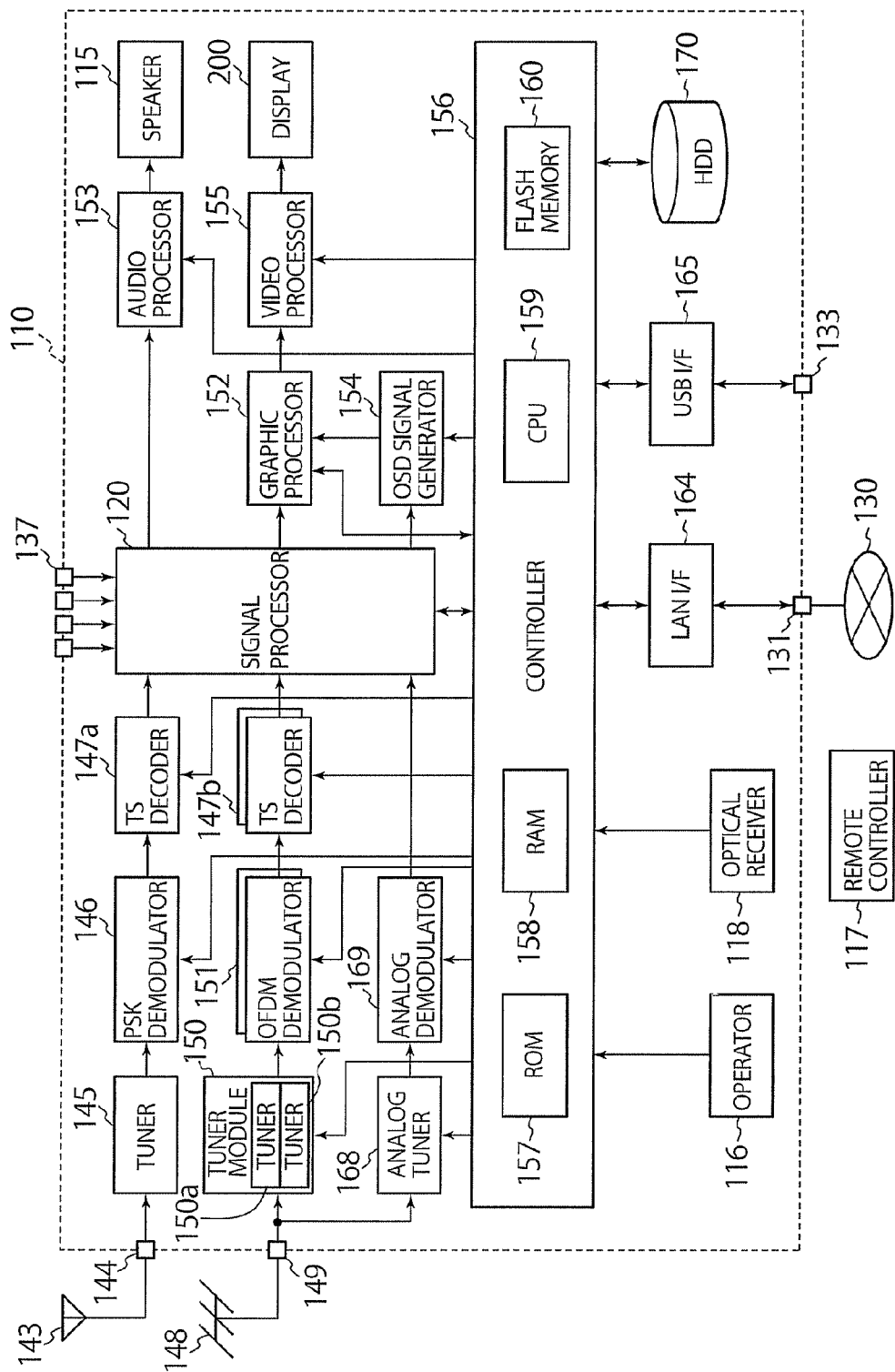
FIG. 1 is a schematic block diagram of an image display system having an image display apparatus 110 according to one embodiment.

FIG. 1 is a schematic block diagram of an image display system having an image display apparatus 110 according to one embodiment.

The image display apparatus 110 has a controller 156 for controlling operations of each part, an operator 116, an optical receiver 118. The controller 156 has a ROM (Read Only Memory) 157, a RAM (Random Access Memory) 158, a CPU (Central Processing Unit) 159 and a flash memory 160.

The controller 156 activates a system control program and various processing programs stored in the ROM 157 in advance in accordance with an operation signal inputted from the operator 116 or inputted through the optical receiver 118 sent from the remote controller 117. The controller 156 controls the operations of each part according to the activated programs using the RAM 158 as a work memory of the CPU 159. Furthermore, the controller 156 stores and uses information and so on necessary for various settings in the flash memory 160 which is a non-volatile memory such as a NAND flash memory, for example.

The image display apparatus 110 further has an input terminal 144, a tuner 145, a PSK (Phase Shift Keying) demodulator 146, a TS (Transport Stream) decoder 147a and a signal processor 120.

The input terminal 144 sends a satellite digital television broadcasting signal received by an antenna 143 for receiving a BS/CS digital broadcast to the tuner 145 for the satellite digital broadcast. The tuner 145 tunes the received digital broadcasting signal to send the tuned digital broadcasting signal to the PSK demodulator 146. The PSK demodulator 146 demodulates the TS from the digital broadcasting signal to send the demodulated TS to the TS decoder 147a. The TS decoder 147a decodes the TS to a digital signal including a digital video signal, a digital audio signal and a data signal to send it to the signal processor 120.

Here, the digital video signal is a digital signal relating to a video which the image display apparatus 110 can output. The digital audio signal is a digital signal relating to an audio which the image display apparatus 110 can output. Furthermore, the data signal is a digital signal indicative of various kind of information about demodulated serves.

The image display apparatus 110 further has an input terminal 149, a tuner module having two tuners 150a and 150b, two OFDM (Orthogonal Frequency Division Multiplexing) demodulators 151, two TS decoders 147b, an analog tuner 168 and an analog demodulator 169.

The input terminal 149 sends a terrestrial digital television broadcasting signal received by an antenna 148 for receiving the terrestrial digital broadcast to the tuner 150 for the terrestrial digital broadcast. The tuners 150a and 150b in the tuner module 150 tune the received digital broadcasting signal to send the tuned digital broadcasting signal to the two OFDM demodulators 151, respectively. The OFDM demodulators 151 demodulate the TS from the digital broadcasting signal to send the demodulated TS to the corresponding TS decoder 147b. The TS decoder 147b decodes the TS to a digital video signal and a digital audio signal and so on to send them to the signal processor 120. The terrestrial digital television broadcast obtained by each of the tuners 150a and 150b in the tuner module 150 are decoded to the digital video signal, the digital audio signal and the digital signal including the data signal simultaneously by the two OFDM demodulators 151 and the TS decoders 147b, and then, can be sent to the signal processor 120.

The antenna 148 can also receive a terrestrial analog television broadcasting signal. The received terrestrial analog television broadcasting signal is divided by a divider (not shown) and sent to the analog tuner 168. The analog tuner 168 tunes the received analog broadcasting signal and sends the tuned analog broadcasting signal to the analog demodulator 169. The analog demodulator 169 demodulates the analog broadcasting signal to send the demodulated analog broadcasting signal to the signal processor 120. Furthermore, the image display apparatus 110 can display CATV (Common Antenna Television) by connecting a tuner for the CATV to the input terminal 149 connected to the antenna 148, for example.

The image display apparatus 110 further has a line input terminal 137, an audio processor 153, a speaker 115, a graphic processor 152, an OSD (On Screen Display) signal generator 154, a video processor 155 and a display 220.

The signal processor 120 performs a suitable signal processing on the digital signal sent from the TS decoders 147a and 147b or from the controller 156. More specifically, the signal processor 120 divides the digital signal into the digital video signal, the digital audio signal and the data signal. The digital video signal is sent to the graphic processor 152, and the divided digital audio signal is sent to the audio processor 153. Furthermore, the signal processor 120 converts the broadcasting signal sent from the analog demodulator 169 to a video signal and an audio signal in a predetermined digital format. The converted digital video signal is sent to the graphic processor 152, and the converted digital audio signal is sent to the audio processor 153. Furthermore, the signal processor 120 performs a digital signal processing on an input signal from the line input terminal 137.

The audio processor 153 converts the inputted audio signal to an analog audio signal in a format capable of being reproduced by the speaker 115. The analog audio signal is sent to the speaker 115 and is reproduced.

The OSD signal generator 154 generates an OSD signal for displaying an UI (User Interface) window or the like in accordance with a control of the controller 156. Furthermore, the data signal divided by the signal processor 120 from the digital broadcasting signal is converted to the OSD signal in a suitable format and is sent to the graphic processor 152.

The graphic processor 152 decodes the digital video signal sent from the signal processor 120. The decoded video signal is combined with the OSD signal sent from the OSD signal generator 154 and is sent to the video processor 155. The graphic processor 152 can send the decoded video signal or the OSD signal selectively to the video processor 155.

Furthermore, the graphic processor 152 generates a plurality of parallax images seen from different viewpoints (images having parallax therebetween), which will be described below in detail.

The video processor 155 converts the signal sent from the graphic processor 152 to an analog video signal in a format the display 200 can display. The analog video signal is sent to the display 200 to be displayed. The display 200 is, for example, a crystal liquid display having a size of "12" inch or "20" inch.

The image display apparatus 110 further has a LAN (Local Area Network) terminal 131, a LAN I/F (Interface) 164, a USB (Universal Serial Bus) terminal 133, a USB I/F 165 and a HDD (Hard Disk Drive) 170.

The LAN terminal 131 is connected to the controller 156 through the LAN I/F 164. The LAN terminal 131 is used as a general LAN-corresponding port using an Ethernet (registered trademark). In the present embodiment, a LAN cable is connected to the LAN terminal 131, and it is possible to communicate with an internet 130.

The USB terminal 133 is connected to the controller 156 through the USB I/F 165. The USB terminal 133 is used as a general USB-corresponding port. For example, a cellular phone, a digital camera, a card reader/writer for various memory cards, a HDD and a key board or the like can be connected to the USB terminal 133 through a hub. The controller 156 can communicate with devices connected through the USB terminal 133.

The HDD 170 is a magnetic storage medium in the image display apparatus 110, and has a function for storing various information of the image display apparatus 110.

Figure 2:
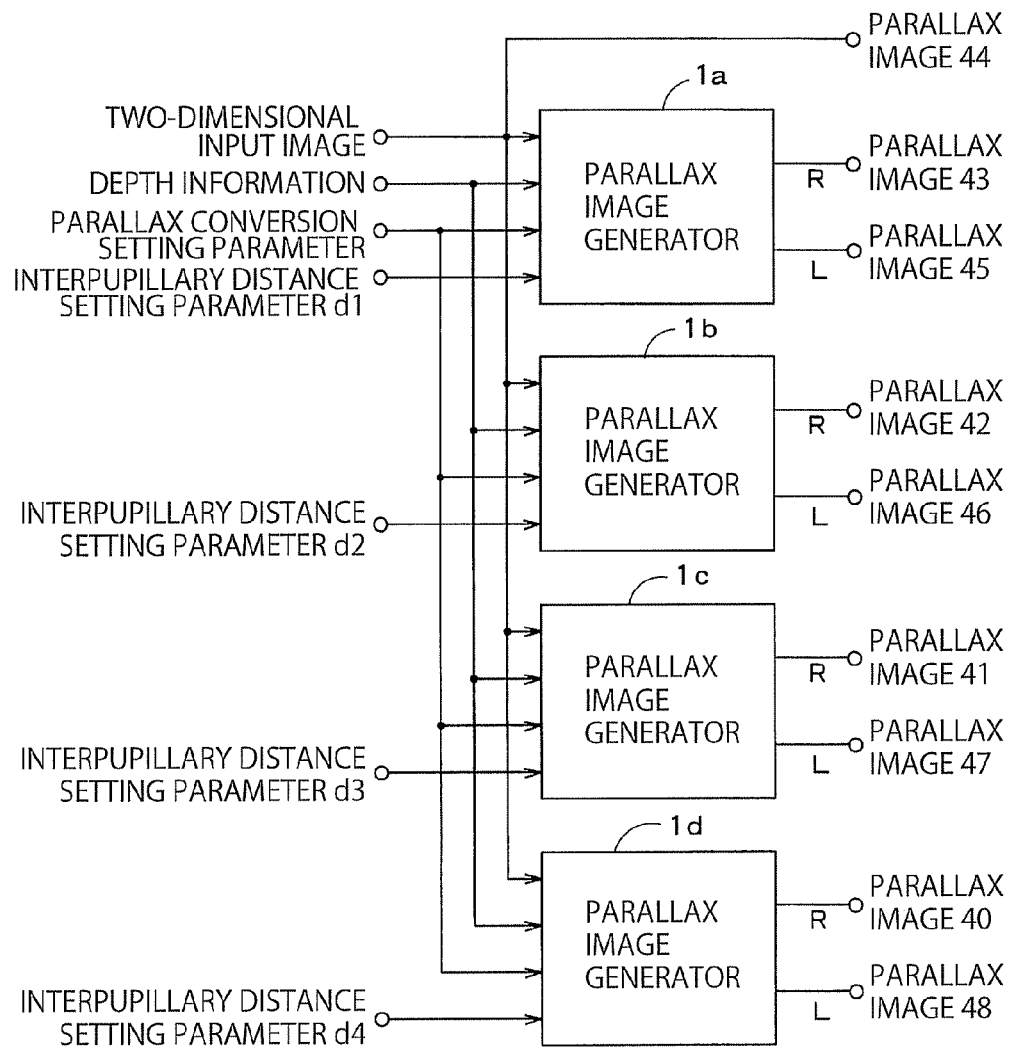
FIG. 2 is a schematic block diagram showing an example of an internal configuration of the parallax image generating device 100.

Next, a parallax image generating device 100, which is one of the characteristic features of the present embodiment, will be explained. FIG. 2 is a schematic block diagram showing an example of an internal configuration of the parallax image generating device 100. The parallax image generating device 100 has four parallax image generators 1a to 1d. The parallax image generating device 100 is, for example, formed on a semiconductor chip, and integrated in the graphic processor 152. Firstly, one parallax image generator 1 will be explained.

Figure 3:
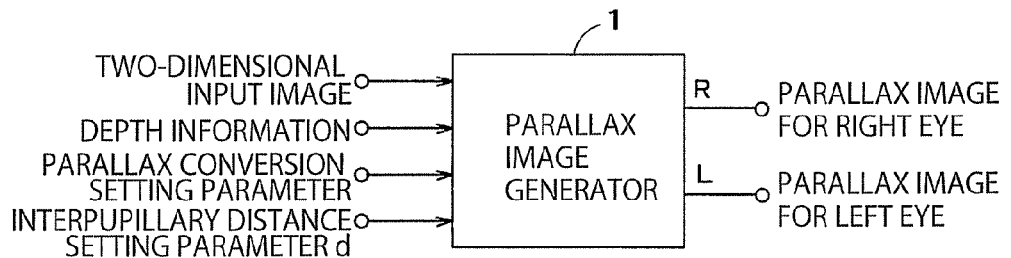
FIG. 3 is a block diagram showing an input-output relationship of the parallax image generator 1.
Figure 4:
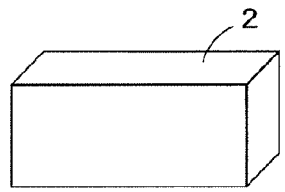
FIG. 4 is a diagram for explaining a processing operation of the parallax image generator 1 of FIG. 3.
Figure 4:
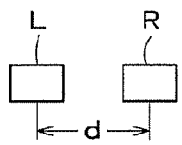
Figure 5:
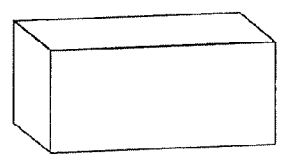
FIG. 5 is a schematic diagram showing an example of parallax images generated by the parallax image generator 1.
Figure 5:

FIG. 3 is a block diagram showing an input-output relationship of the parallax image generator 1. FIG. 4 is a diagram for explaining a processing operation of the parallax image generator 1 of FIG. 3. Furthermore, FIG. 5 is a schematic diagram showing an example of parallax images generated by the parallax image generator 1. The parallax image generator 1 generates two parallax images, that is, a parallax image for left eye and a parallax image for right eye from a two-dimensional input image for a stereoscopic image display with glasses based on a known manner.

The two-dimensional input image, depth information, a parallax conversion setting parameter, and a parameter for setting a distance between viewpoints "d", are inputted to the parallax image generator 1.

The depth information includes information indicative of which the depth of each pixel is near-side or a far-side and how long the depth is. The depth information can be added to the input image in advance, or can be generated based on the characteristics of the input image by a depth generator (not shown). In a case of generating the depth information, pixels having a larger motion vector detected in the input image can be set to exist at near-side, and that having a smaller motion vector can be set to exist at far-side, for example.

Furthermore, the parallax conversion setting parameter is one or more parameters for generating the parallax images. For example, the parallax conversion setting parameter may be a viewing distance indicative of a distance between the viewer and the display 200, a depth setting parameter indicative of a distance form a position nearest to the viewer to a position farthest from the viewer, and so on. The depth information and the parallax conversion setting parameter are called as a parallax image generation parameter, as a whole.

Then, the parallax image generator 1 generates a parallax image of an object 2 seen by the right eye R (parallax image for right eye) and a parallax image seen by the left eye L (parallax image for left eye) as shown in FIG. 4. The distance between the right eye R and the left eye L corresponds to the parameter for setting the distance between viewpoints "d", and the parameter for setting the distance between viewpoints "d" exists between the parallax image for right eye and that for left eye. Note that, the parameter for setting the distance between viewpoints "d" is not included in the parallax image generation parameter.

For example, in the parallax image for left eye, if a first object exists in front of a second object, the first object is seen shifting to the right side. Therefore, the parallax image generator 1 shifts the first object to the right side based on the depth information. The shifting amount depends on the parallax image generation parameter and the parameter for setting the distance between viewpoints "d". For example, as the depth information or the depth setting parameter is larger, or as the viewing distance is smaller, the shifting amount is set larger. Then, the place the first object had existed is interpolated by using surrounding pixels arbitrarily. By such a manner, the parallax image for right eye and that for left eye are generated as shown in FIG. 5. In this case, the two-dimensional input image inputted to the parallax image generator 1 corresponds to an image seen from a center of the right eye R and the left eye L. In other word, there is a parallax of "d/2" between the input image and the parallax image for right eye in the right side of the input image, and there is a parallax of "d/2" between the input image and the parallax image for left eye in the left side of the input image.

Figure 6:
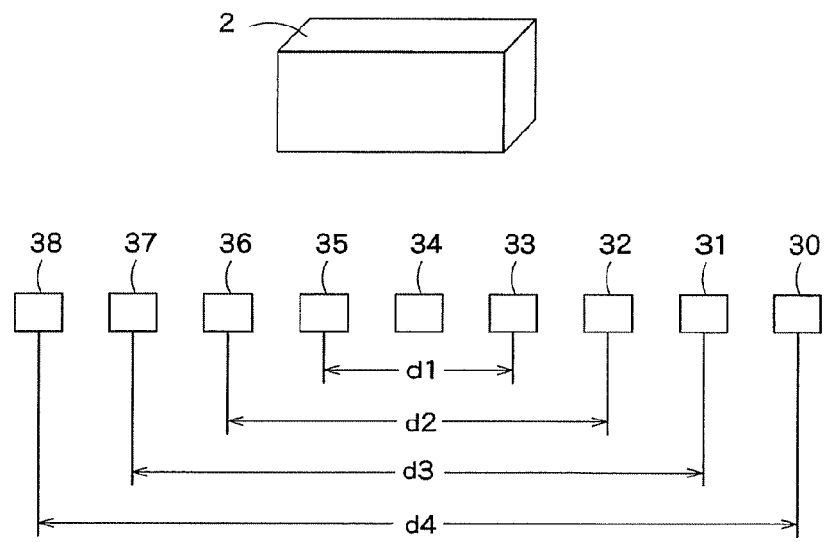
FIG. 6 is a diagram for explaining a processing operation of the parallax image generating device 100.
Figure 7:
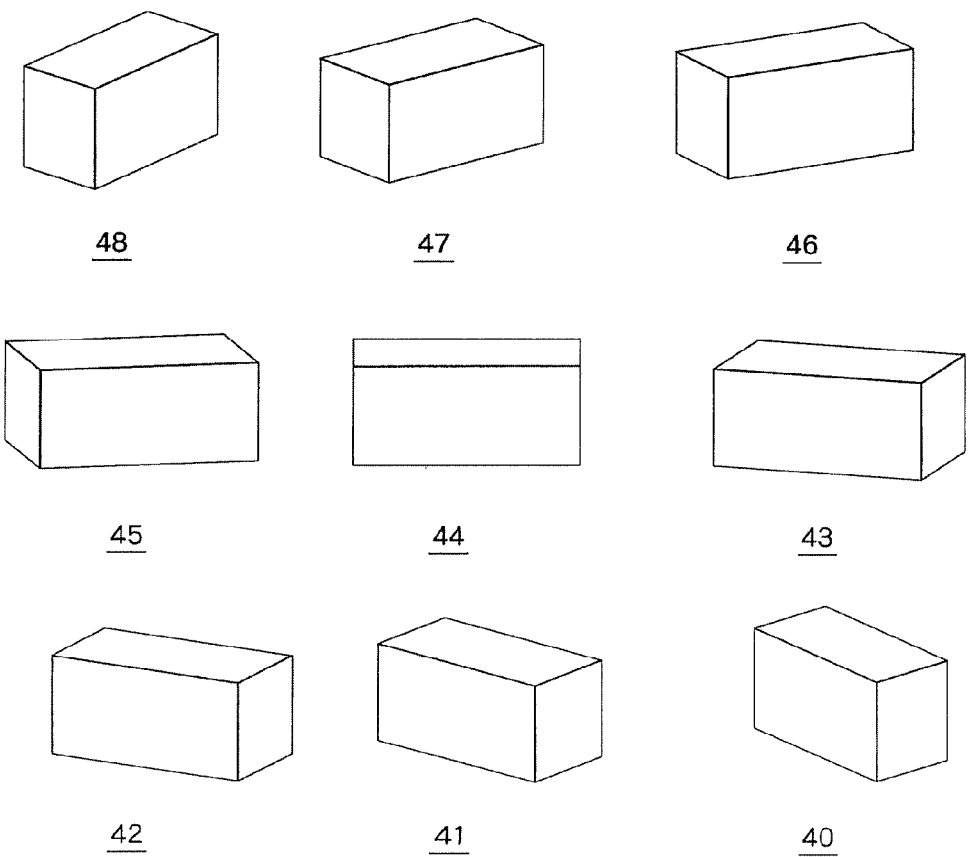
FIG. 7 is a schematic diagram showing an example of parallax images generated by the parallax image generating device 100.

The parallax image generating device 100 of FIG. 2 has for parallax image generators 1 of FIG. 3. FIG. 6 is a diagram for explaining a processing operation of the parallax image generating device 100. FIG. 7 is a schematic diagram showing an example of parallax images generated by the parallax image generating device 100.

Common two-dimensional input image, the depth information and the parallax conversion setting parameter (parallax image generation parameter) are inputted to the parallax image generators 1a to 1d. Furthermore, the parallax image generators 1a to 1d are provided with parameters for setting the distance between viewpoints d1 to d4, which are different from each other, respectively. Each of the parallax image generators 1a to 1d generates two parallax images to output them. Furthermore, the input image is also outputted as one of the parallax images.

The two-dimensional input image inputted to the parallax image generators 1a to 1d in common corresponds to an image of the object 2 seen from a central viewpoint 34, that is, a parallax image 44 of FIG. 7. The parallax image for right eye generated by the parallax image generator 1a corresponds to a parallax image 43 of the object 2 seen from a viewpoint 33 and that for left eye corresponds to a parallax image 45 seen from a viewpoint 35. The distance between the viewpoints 33 and 35 corresponds to the parameter for setting the distance between viewpoints "d1". Furthermore, the viewpoints 33 and 35 locate bilaterally with respect to the central viewpoint 34 as a center. Namely, the input image corresponds to the parallax image 44 seen from a center of the viewpoints 33 and 35.

Similarly, the parallax image generator 1b generates the parallax image 42 seen from the viewpoint 32 and the parallax image 46 seen from the viewpoint 36, the parallax image generator 1c generates the parallax image 41 seen from the viewpoint 31 and the parallax image 47 seen from the viewpoint 37, and the parallax image generator 1d generates the parallax image 40 seen from the viewpoint 30 and the parallax image 48 seen from the viewpoint 38. The distance between the viewpoints 32 and 36 corresponds to the parameter for setting the distance between viewpoints "d2", the distance between the viewpoints 31 and 37 corresponds to the parameter for setting the distance between viewpoints "d3", and the distance between the viewpoints 30 and 38 corresponds to the parameter for setting the distance between viewpoints "d4". By such a manner, the parallax image generating device 100 can generate nine parallax images 40 to 48 including the input image as shown in FIG. 7.

Note that, the right eye and the left eye of human beings substantially line along a horizontal direction. Therefore, it is preferable that the viewpoints 30 to 38 are arranged in the horizontal direction. Furthermore, the intervals between two of the viewpoints 30 to 38 can be or cannot be constant.

As stated above, in the first embodiment, parallax images are generated by using a plurality of parallax image generators 1 each of which generates two parallax images. Because a known manner can be applied to the parallax image generator 1, a lot of parallax images can be generated without developing a complicated parallax image generator.

Second Embodiment

In the first embodiment described above, a plurality of parallax image generators are used. On the other hand, in a second embodiment which will be described below, one parallax image generator is used and one of the plurality of parameters for setting the distance between viewpoints is inputted to the parallax image generator by changing it time-divisionally.

Figure 8:
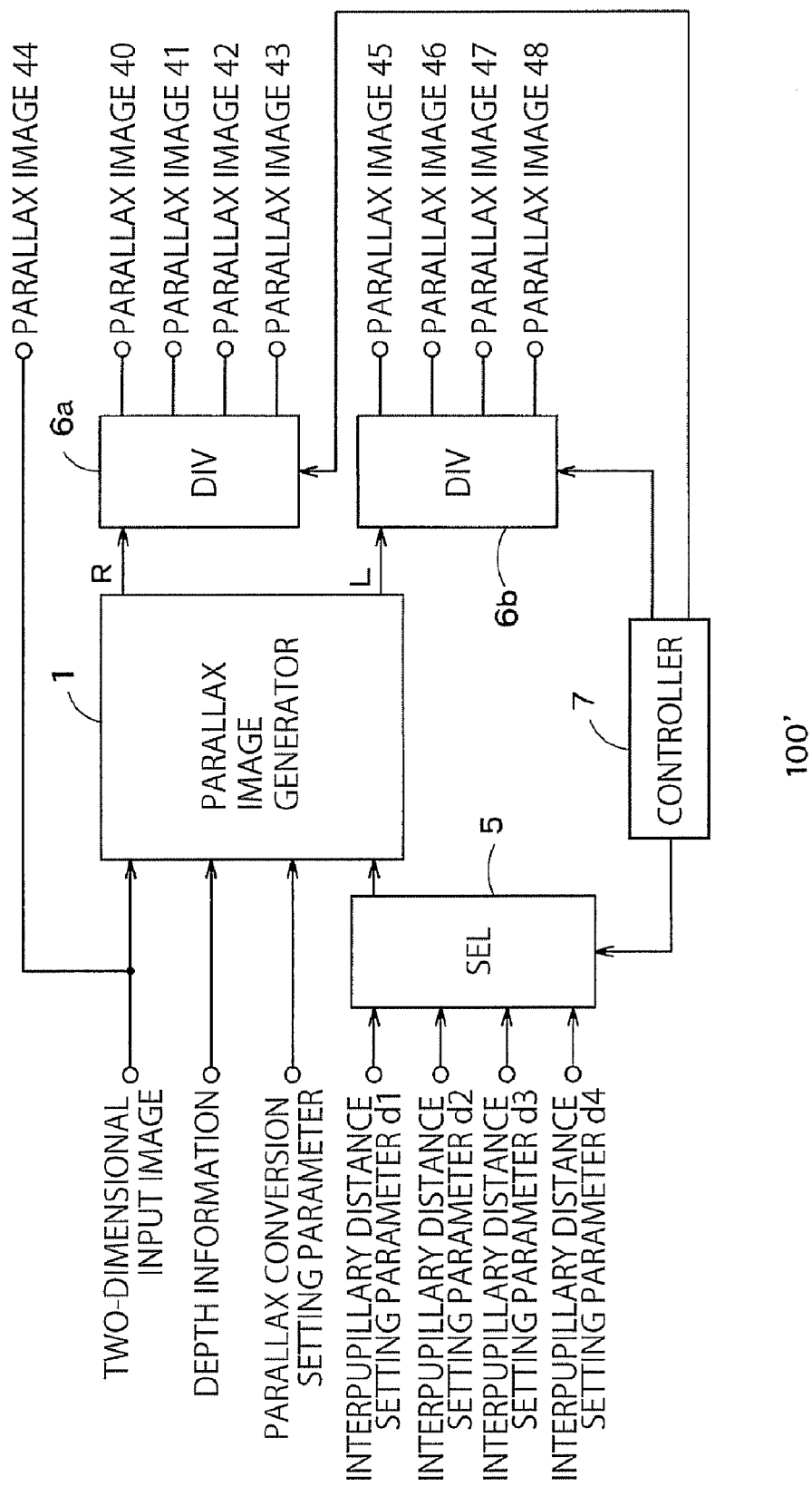
FIG. 8 is a schematic block diagram showing an example of an internal configuration of a parallax image generating device 100' according to the second embodiment.

FIG. 8 is a schematic block diagram showing an example of an internal configuration of a parallax image generating device 100' according to the second embodiment. The parallax image generating device 100' has one parallax image generator 1, a selector (SEL) 5, dividers (DIV) 6a and 6b, and a controller 7.

The parameters for setting the distance between viewpoints "d1" to "d4" identical to FIG. 2 are inputted to the selector 5. The selector 5 selects one of the parameters for setting the distance between viewpoints "d1" to "d4" to output it to the parallax image generator 1. The two-dimensional input image, the depth information, the parallax conversion setting parameter, and one of the parameters for setting the distance between viewpoints "d1" to "d4" selected by the selector 5. The parallax image generator 1 generates the parallax image for right eye to output it to the divider 6a and generates the parallax image for left eye to the divider 6b. In accordance with the selected parameter for setting the distance between viewpoints by the selector 5, the divider 6a sets the inputted parallax image for right eye to one of the parallax images 40 to 43, and the divider 6b sets the inputted parallax image for left eye to one of the parallax images 45 to 48. The controller 7 controls the selector 5 and dividers 6a and 6b.

The parallax image generating device 100' of FIG. 8 operates as follows. Firstly, the controller 7 controls the selector 5 to select the parameter for setting the distance between viewpoints "d1". Then, the controller 7 controls the divider 6a to set the parallax image for right eye generated by the parallax image generator 1 to the parallax image 43 and controls the divider 6b to set the parallax image for left eye generated by the parallax image generator 1 to the parallax image 45. Next, the controller 7 controls the selector 5 to select the parameter for setting the distance between viewpoints "d2". Then, the controller 7 controls the divider 6a to set the parallax image for right eye to the parallax image 44 and controls the divider 6b to set the parallax image for left eye to the parallax image 46. Similarly, the controller 7 controls the selector 5 to select one of the parameters for setting the distance between viewpoints "d1" to "d4" by turns, and change the output terminal of the generated parallax images in accordance with the selected parameter for setting the distance between viewpoints.

By such a manner, the parallax image generating device 100' can generate nine parallax images 40 to 48 as shown in FIG. 7.

As stated above, in the second embodiment, one parallax image generator is used and one of the plurality of parameters for setting the distance between viewpoints is inputted to the parallax image generator by changing it time-divisionally to generate the parallax images. Therefore, a lot of parallax images can be generated by a smaller parallax image generating device.

Note that, FIG. 8 shows an example where one parallax image generator is used. However, it is possible to provide two or more parallax image generators, and selectors and dividers corresponding thereto to generate a lot of parallax images in shorter time.

Furthermore, the number of the parallax images is not limited to nine, and it is enough that at least five images including the central parallax image are generated. Additionally, although an example is shown where the parallax image generating device is integrated on the image display apparatus in the above mentioned embodiments, the image processing device can be composed by integrating the parallax image generating device on a broadcast receiver such as a STB (Set Top Box) or a reproduction device of a recording media and so on.

At least a part of the image processing device explained in the above embodiments can be formed of hardware or software. When the image processing device is partially formed of the software, it is possible to store a program implementing at least a partial function of the image processing device in a recording medium such as a flexible disc, CD-ROM, etc. and to execute the program by making a computer read the program. The recording medium is not limited to a removable medium such as a magnetic disk, optical disk, etc., and can be a fixed-type recording medium such as a hard disk device, memory, etc.

Further, a program realizing at least a partial function of the image processing device can be distributed through a communication line (including radio communication) such as the Internet etc. Furthermore, the program which is encrypted, modulated, or compressed can be distributed through a wired line or a radio link such as the Internet etc. or through the recording medium storing the program.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fail within the scope and spirit of the inventions.

The invention claimed is:

1. An image processing device comprising:
a plurality of parallax-image generators each of which is configured to generate a first image and a second image based on an input image, the first image being viewed from a first viewing point away from a viewing point of the input image by a predetermined distance, the second image being viewed from a second viewing point away from the viewing point of the input image by the predetermined distance at an opposite side of the first viewing point,
wherein the same input image is inputted to each parallax-image generator, and
the predetermined distance differs for each parallax-image generator.

2. The device of claim 1, wherein the first images and the second images generated by the parallax-image generators are parallax images seen from a plurality of viewpoints arranged substantially in a horizontal direction.

3. The device of claim 1 further comprising a plurality of selectors, each of the selectors corresponding to one of the parallax image generators and being configured to select one of a plurality of parallax setting values, each of which indicates the predetermined distance different from each other by turns,
wherein each of the parallax image generators is configured to generate the first image and the second image based on the parameter for setting the distance between viewpoints selected by the corresponding selector.

4. The device of claim 1, wherein each of the parallax-image generators is configured to generate the first image and the second image further based on a parallax-image-generation parameter, wherein the same parallax-image-generation parameter is inputted to each parallax-image generator.

5. The device of claim 4, wherein the parallax image generation parameter includes at least depth information relating to the input image.

6. The device of claim 1, further comprising a display configured to display the first image and the second image.

7. An image processing method comprising:
inputting an input image to a plurality of parallax-image generators, such that the same input image is inputted to each parallax-image generator;
inputting a different parameter for setting a distance between viewpoints to each of the plurality of parallax-image generators;
with each of the plurality of parallax image generators, generating a first image and a second image based on an input image, the first image being viewed from a first viewing point away from a viewing point of the input image by a predetermined distance, the second image being viewed from a second viewing point away from the viewing point of the input image by the predetermined distance at an opposite side of the first viewing point,
wherein the predetermined distance differs for each parallax-image generator.

8. The method of claim 7, wherein the first images and the second images generated by the parallax image generators are parallax images seen from a plurality of viewpoints arranged substantially in a horizontal direction.

9. The method of claim 7 further comprising, for each of the parallax-image generators, selecting with a selector associated with a corresponding parallax-image generator one of a plurality of setting values, each of which indicates the predetermined distance different from each other by turns, prior to inputting the selected parameter to the corresponding parallax-image generator.

10. The method of claim 9, wherein a different selector is associated with each parallax-image generator.

11. The method of claim 7, further comprising inputting a parallax-image-generation parameter to the parallax-image generators, such that the same parallax-image-generation parameter is input to each parallax-image generator, and
wherein, for each of the parallax-image generators, the first image and the second image are generated further based on the parallax image generation parameter.

12. The method of claim 11, wherein the parallax image generation parameter includes at least depth information relating to the input image.

13. The device of claim 1, wherein the input image is outputted as an image viewed from a center of the first viewing point and the second viewing point, and as an image to be displayed with the first image and the second image.

14. The method of claim 7 further comprising outputting the input image as an image viewed from a center of the first viewing point and the second viewing point, and as an image to be displayed with the first image and the second image.

* * * * *